(No Model.) 3 Sheets—Sheet 1.
T. J. LOCKWOOD.
ADDING DEVICE AND REGISTER.
No. 500,919. Patented July 4, 1893.
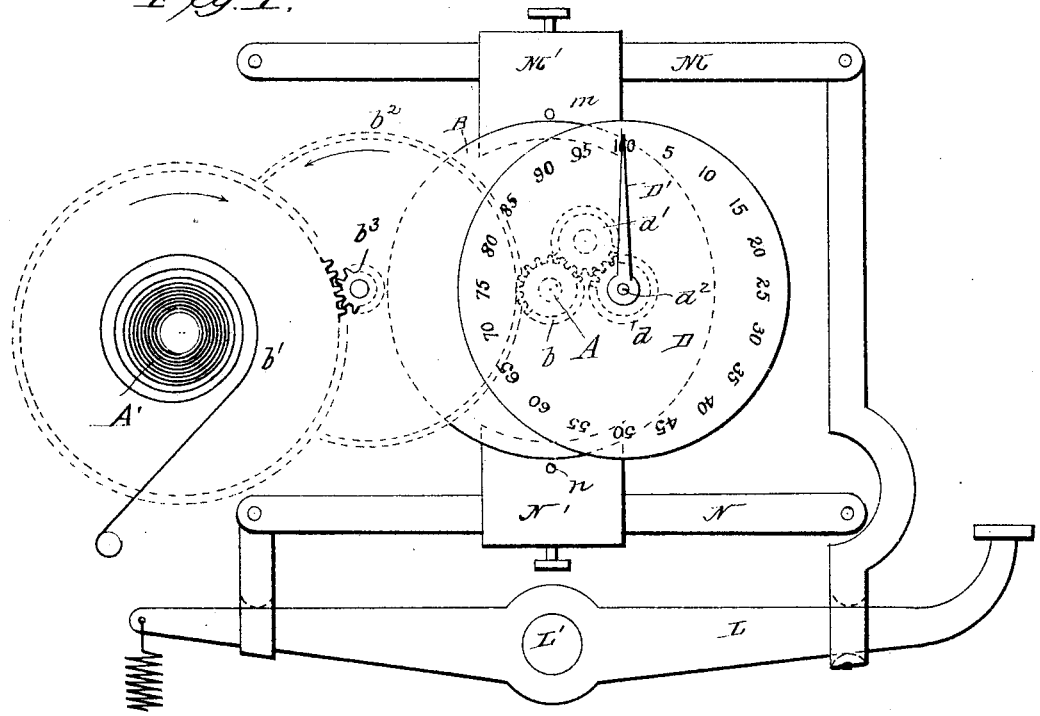
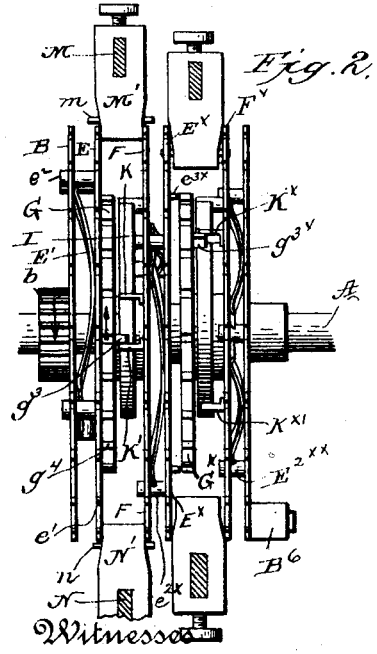
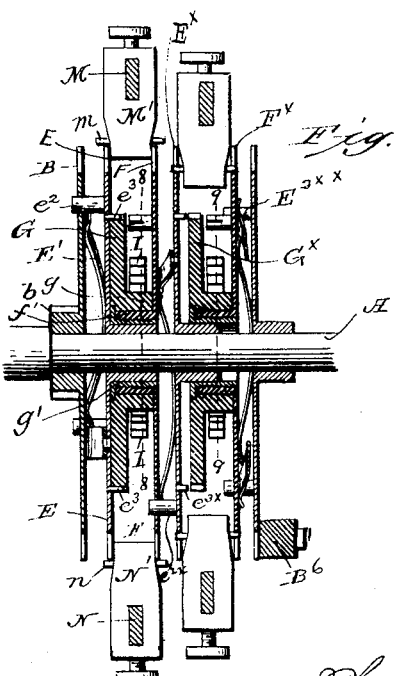
Witnesses
E. D. Smith
Thomas Durant
Inventor
Thomas J. Lockwood,
By his Attorneys
Church & Church (No Model.) 3 Sheets—Sheet 2.
T. J. LOCKWOOD.
ADDING DEVICE AND REGISTER.
No. 500,919. Patented July 4, 1893.
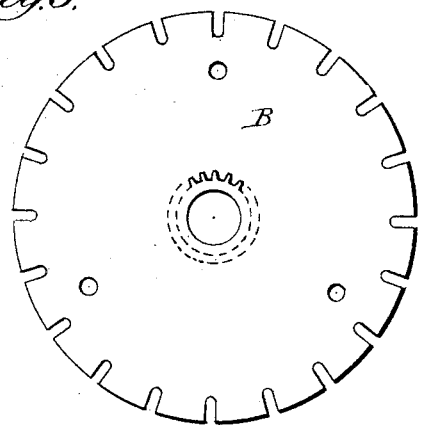
Fig. 3.
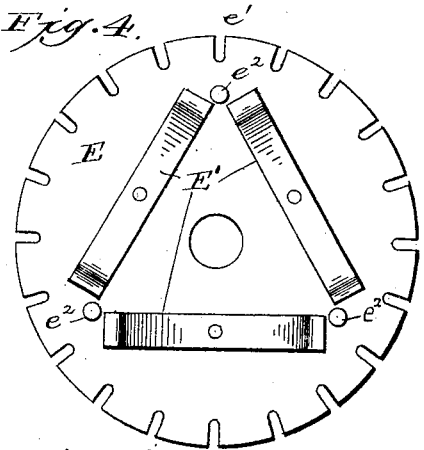
Fig. 4.
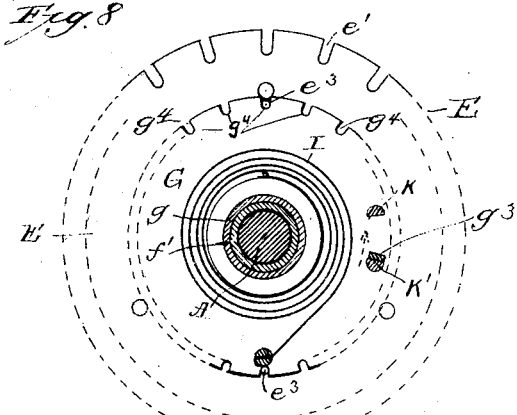
Fig. 8.
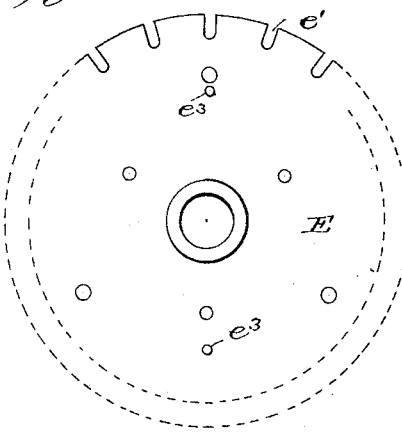
Fig. 4ª.
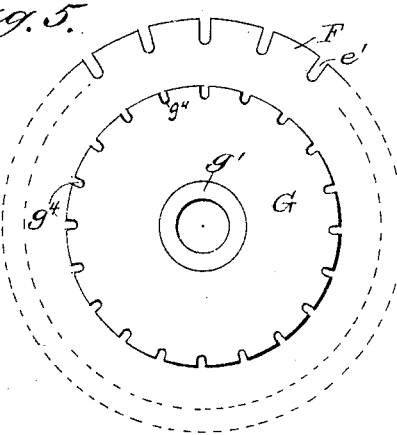
Fig. 5.
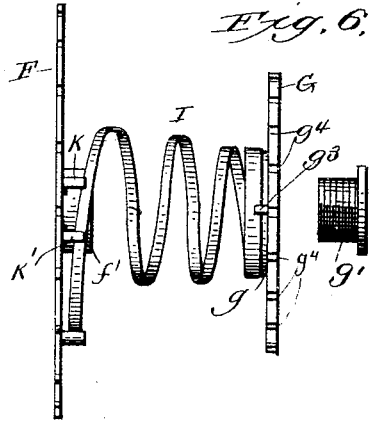
Fig. 6.
Witnesses
E. D. Smith
Thomas Durant
Inventor
Thomas J. Lockwood,
By his Attorneys
Church & Church (No Model.) 3 Sheets—Sheet 3.

T. J. LOCKWOOD.
ADDING DEVICE AND REGISTER.

No. 500,919. Patented July 4, 1893.

Witnesses
E. D. Smith
Thomas Durant

Inventor
Thomas J. Lockwood
By his Attorneys
Church & Church

UNITED STATES PATENT OFFICE.

THOMAS J. LOCKWOOD, OF MUNCIE, INDIANA, ASSIGNOR TO THE NATIONAL CASH REGISTER COMPANY, OF DAYTON, OHIO.

ADDING DEVICE AND REGISTER.

SPECIFICATION forming part of Letters Patent No. 500,919, dated July 4, 1893.

Application filed October 1, 1890. Serial No. 366,726. (No model.)

*To all whom it may concern:*

Be it known that I, THOMAS J. LOCKWOOD, of Muncie, in the county of Delaware and State of Indiana, have invented certain new and useful Improvements in Adding Devices and Registers; and I do hereby declare the following to be a full, clear, and exact description of the same, reference being had to the accompanying drawings, forming a part of this specification, and to the letters of reference marked thereon.

My invention relates to improvements in adding devices and registers such as are particularly designed for use in what are known as cash registers and it consists in the novel construction and combinations and sub-combinations of parts which will be first described and then pointed out particularly in the clauses of claim at the close of this specification.

In the accompanying drawings I have attempted to show so much only of a cash register as is necessary to illustrate the application of my invention to that class of machines.

Figure 9:
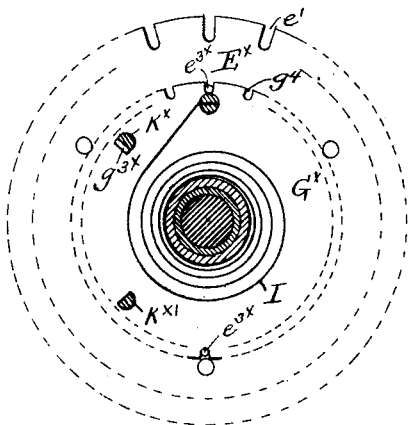
Figure 10:
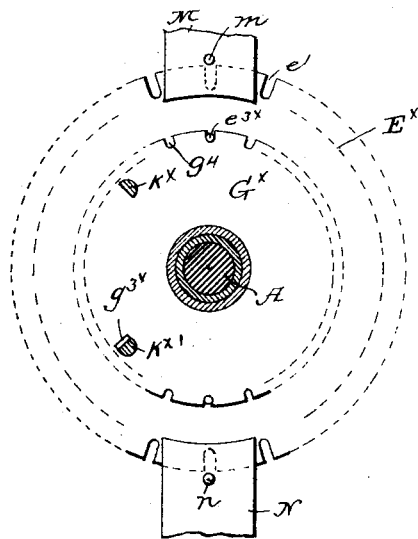
Figure 11:
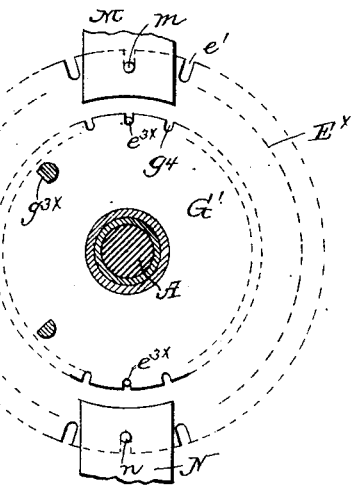

Figure 1 represents in elevation the dial and pointer for indicating the sum total of the sales or other items of which the machine is designed to keep an account; the motor mechanism and gearing by which the power of the same is communicated to the revoluble detents and the detent arresters; and one of the finger keys; and connecting mechanism by which a revoluble detent and its corresponding detent arrester are separated and at the same time prevented from forward rotation. Fig. 2 is a front elevation of two sets of revoluble detents and detent arresters showing the shaft upon which they are mounted and means for separating the detent supports from the detent arresters. Figs. 3 and 4 represent the disks which constitute one of the detent supports. Fig. 4$^a$ represents a view of the opposite side of the disk shown in Fig. 4; Fig. 5 a view of one of the detent arresters; Fig. 6 a detail view showing the parts constituting the detent arrester; Fig. 7 a sectional view taken longitudinally through the shaft upon which the detent supports and detent arresters are mounted. Fig. 8 is a cross sectional view taken on the line 8—8 Fig. 7 looking to the left. Fig. 9 is a similar view taken on the line 9—9 of the same figure also looking to the left; Figs. 10 and 11 views illustrating the manner in which the separating devices or wedges controlled by the finger keys operate to separate the detent arresters from the detent support and at the same time lock said supports and arresters from forward rotation and vice versa.

The same letters of reference in the several figures indicate the same or similar parts.

A represents a fixed shaft upon which the principal operative parts of the mechanism are mounted.

B is a disk loosely mounted upon the shaft A and having secured to it a pinion $b$ with which meshes a gear $b^2$ (Fig. 1) that carries a pinion $b^3$ which is in mesh with and receives motion from a drum $b'$ actuated by a spring-motor A' all as shown in Fig. 1. Also loosely mounted upon the shaft A is a disk E which has a series of pins $e^2$ (see Figs. 2 and 4) on the side adjacent the disk B which pins are adapted to enter corresponding apertures in said last mentioned disk to permit lateral motion of the two disks relatively to each other along the shaft A but cause them to rotate together. Between the disks B and E, springs E' are interposed the incidental effect of which is to keep said disks B and E separated but the main purpose of which is to cause the disk E to be pressed toward a third disk F loose on the hub of disk E and to keep one or more detents $e^3$ (Figs. 4$^a$, 7, and 8) carried on the disk E in engagement with corresponding peripheral notches $g^4$ in a smaller disk G supported upon the hub of the disk F.

The disks B and E which rotate together and the latter of which carries the detents $e^3$ constitute what may be hereinafter referred to as a "detent support or revoluble detent support;" and the disk F with its smaller disk G together constitute what may be hereinafter termed a "detent arrester."

Referring particularly to the structure of the detent arrester it will be seen that both the disk F and the disk G have respectively hubs $f'$ and $g$ projecting from their proximate faces, the former hub $f'$ fitting within the latter $g$, as shown in Fig. 7, and the relative position of the parts being preserved by means of a bushing $g'$ screwed into the hub $f'$ and having its head or flange seated in an annular recess or seat in the outer surface of the disk G. This bushing serves to hold the disk G to the disk F while permitting it to rotate freely on the hub $f'$ of the disk F. The interior of the bushing $g'$ forms the bore of the hub of the disk F and its bearing on the hub of the disk E. From that side of the disk G which is next the disk F projects a stop $g^3$ Fig. 2 and from the side of the disk F project two other stops K, K' between which the stop $g^3$ of the disk G is capable of a limited movement. A spring I connected at one end to a lug on the disk F and at the other end to the hub of the disk G tends to rotate the disk G backward in the direction indicated by the arrow in Fig. 2. Further along the shaft A is a duplication of disks, springs, stops, &c., already described, constituting another detent support and detent arrester, the only difference being that the stops $K^\times$, and $K^{\times\prime}$, upon the disk $F^\times$ corresponding to the stops K, K', on the disk F of the first set, are farther apart so as to permit a greater latitude of movement to the stop $g^{3\times}$ than is permitted to the stop $g^3$. The number of sets of detent supports and co-operating detent arresters may be continued along the shaft indefinitely it only being essential that the last disk of the series be anchored or fixed rigidly to some part of the frame work, as shown for instance at $B^6$, in Figs. 2 and 7, in order that, the connected series of disks may be normally prevented from rotation by the action of the spring motor.

I have illustrated in the drawings but two sets of detent supports and detents and co-operating detent arresters. The first of these is designed to register amounts of say five cents, to which end the periphery of the disk G of the detent arrester is provided with twenty notches $g^4$ for co-operation with the detents $e^3$ of the detent support and the stop $g^3$ on said disk is placed immediately beneath one of said notches while the stops K, K', on the disk F with which the said stop $g^3$ co-operates are separated a distance just equal to the distance between the peripheral notches of the disk G.

From the construction so far described it will be understood that the coiled spring I is constantly tending to turn the disk G backward (in the direction of the arrow on said disk in Fig. 2) and that the disk is held from turning under the impulse of the spring by the engagement of notches in its periphery with the detents $e^3$ on disk E. It will also be understood that the main actuating motor of the machine (the coiled spring A' in Fig. 1) is constantly tending (through the medium of the train of gears $b'$, $b^3$, $b^2$, and $b$) to turn the disks B and E in the direction indicated by the arrow on the pinion $b$, and that they are held in check only by the stop $g^3$ on disk G bearing against the lower stop K' on disk F, the latter being held in check by the train of disks and connections behind it, all of which are held in check by the fixed point $B^6$ to which the last disk is secured. If now the disks E F be spread apart until the detents $e^3$ are disengaged from the notches in the periphery of disk G, and the disk E be itself held from turning, the spring I will immediately turn the disk G backward in the direction of the arrow on it until the stop $g^3$ strikes the upper stop K on the disk F. As before stated the stops K and K' are such distance apart that the movement of the stop $g^3$ from one to the other will move the disk G just the distance between two of its notches; so that when the disk G is moved backward by the spring I, as above described, other notches in its periphery are brought into line with the detents $e^3$ on disk E. If the pressure which has spread apart disks E and F or moved E away from F, be now removed the springs E' will push E back toward F again and the detents $e^3$ will engage the new notches in the disk G which have been brought into line with them. At this point of the operation, inasmuch as the main motor A' is tending to turn the disk E in the direction of the arrow on the pinion $b$, Fig. 2 and inasmuch as the stop $g^3$ whose engagement with the stop K' normally holds the disk from turning in that direction is now up against the upper stop K, it will be seen that the only thing which holds the disk E' from turning under the impulse of the main motor is the means which was applied to it for that purpose at the same time that it was moved away from the disk F, so that if it be now released from such holding means it will immediately turn forward until the stop $g^3$ again engages the lower stop K' on disk F. The result of this operation is that whenever the disk E is moved away from disk F and held from turning the disk G will turn backward until arrested by engagement of the stop $g^3$ with the upper stop K on disk F, and that upon allowing disk E to be pressed back toward disk F by the springs E' and then released it will turn forward one twentieth of a revolution (the distance, as before stated, between the notches on the disk G) and in so turning will turn the disk B and pinion $b$ with it, and the pinion $b$ may transmit such movement to a registering device, as hereinafter described. It will be also understood that in this turning forward of the disk E, carrying the disk G with it until the stop $g^3$ engages the stop K', the main motor overcomes the tension of the spring I which has turned the disk G backward, and winds up said spring ready for the next operation, so that upon again moving the disk E away from disk F and disengaging its detents $e^3$ from the notches in the disk G the latter will be immediately turned backward by the spring I until the stop $g^3$ strikes the stop K, as before described.

In Figs. 2 and 7 the disks $E^\times$ and $F^\times$, corresponding to the disks E F of the first set, are shown spread apart and the detents $e^{3\times}$ disengaged from the notches $g^{4\times}$ in the periphery of the disk $G^\times$. The coiled spring corresponding to the spring I of the first set has turned the disk $G^\times$ backward until its stop $g^{3\times}$ has engaged the upper stop $K^\times$ on the disk $F^\times$. It will be seen that the stops $K^\times$ and $K^{\times\prime}$ of this second set are farther apart than the stops K and K' of the first set, so that in moving the stop $g^{3\times}$ from one to the other the disk $G^\times$ will turn the distance between several of its notches. As illustrated in the drawings it is intended to turn the distance between four of its notches or four twentieths of a revolution. The disk F of the first set and the disk $E^\times$ of the second set are so connected as to rotate together, but at the same time being capable of moving laterally on the shaft A toward and from each other, Figs. 2 and 7. As shown in the drawings this connection is formed by pins $e^{2\times}$ upon the disk $E^\times$ passing through holes in the disk F. Springs similar to E' are interposed between the disks F and $E^\times$, to restore them to normal position after they have been moved laterally on the shaft A toward each other. Similar springs are also interposed between the disk $F^\times$ and the last disk of the series, which disks are connected by pins $E^{2\times\times}$ similar to the pins $e^{2\times}$.

From the connection of the disks F and $E^\times$ by the pins $E^{\times\times}$ it will be seen that the power of the main motor is transmitted through the first set of disks to the disk $E^\times$ and constantly tends to turn said disk forward, as it does the disk E. Such being the case, when, in the position of the parts shown in Figs. 2 and 7, the disk $E^\times$ is allowed to move backward toward the disk $F^\times$ and its detents $e^{3\times}$ to engage the new notches in the disk $G^\times$ and is then released, the power of the main motor will immediately turn it forward until the stop $g^{3\times}$ on disk $G^\times$ again engages the lower stop $K^{\times\prime}$ on disk $F^\times$. As the disk $E^\times$ thus turns forward the disks E and F and pinion $b$ will of course turn with it, since it is through them that the power of the motor is transmitted to the disk $E^\times$, and the registering device actuated by the pinion $b$ will consequently register four twentieths of a revolution.

It will thus be seen that the several sets of disks and their connections (no matter how many there may be) constitute an escapement mechanism which normally holds the main motor in check, and that when different portions of this escapement mechanism are operated in the manner described the motor is allowed to expend more or less of its power, according to which portion of the escapement mechanism is operated, and consequently to add a greater or less amount upon the registering device which may be actuated by the pinion $b$. The power of the motor is transmitted from this pinion $b$ through all of the sets of disks and their connections which may be mounted on the shaft A to the fixed point $B^6$ to which the last disk of the series is secured. It will therefore be seen that not only will the disengagement of any detent disk (as E) from its co-operating escapement disk (as G,) and their re-engagement with each other and release of the detent disk, in the manner before described, permit the motor to turn the pinion $b$ a distance proportionate to the distance between the two stops (as K and K') with which the stop upon the operated escapement co-operates, but also that if any two or more detent disks be simultaneously disengaged from their co-operating escapement disks and held from turning, and are then simultaneously allowed to re-engage their respective escapement disks and released, the motor will be allowed to turn the pinion $b$ a distance equal to the sum of all of the distances turned by the several operated detent disks. Thus, in Figs. 2 and 7 if the disks E and $E^\times$ be simultaneously moved to the left to disengage their detents from the disks G and $G^\times$ and be held from turning under the impulse of the main motor, the coiled springs I, &c., will immediately turn the disks G and $G^\times$ backward until their stops $g^3$ and $g^{3\times}$ engage the upper stops K and $K^\times$ upon the disks F and $F^\times$; and if the disks E and $E^\times$ are then allowed to move to the right again to re-engage their detents with the disks G and $G^\times$, and are then released, the power of the main motor which, as before stated, constantly tends to turn the pinion $b$ and disks B and E forward in the direction indicated by the arrow on said pinion, will at once turn the disk E in that direction until the stop $g^3$ strikes the stop K'. At this point the power of the main motor A' is brought to bear upon the disk F, and, through the pins $e^{2\times}$, upon the disk $E^\times$, and as the stop $g^{3\times}$ upon the disk $G^\times$, which normally holds the disk $E^\times$ from being turned by the motor, is now up against the under side of the upper stop $E^\times$, there is nothing to hold the disk $E^\times$ in check and the motor is therefore allowed to turn it forward until the stop $g^{3\times}$ is brought into engagement with the lower stop $K^{\times\prime}$.

It will thus be seen that the operation of the first set of disks has allowed the motor to turn the pinion $b$ forward the distance between two notches upon the disk G, or one twentieth of a revolution, while the simultaneous operation of the second set of disks has permitted the motor to turn the pinion forward an additional four twentieths of a revolution; the result of the simultaneous operation of the two sets of disks being that the motor is allowed to turn the pinion $b$ forward five twentieths of a revolution and to make a corresponding registry upon the mechanism connected with said pinion.

It will of course be understood that if there were half a dozen sets of disks mounted on the shaft A between the main motor and the fixed point $B^6$, the simultaneous operation of all of them would permit the motor to turn the pinion $b$ a distance equal to the sum of the movements of all of the detent disks.

Inasmuch, as before stated, the train of disks and connections mounted on the shaft A constitute simply an escapement mechanism, holding the main motor in check, and controlling the extent of its movements, it is of course evident that the registering device to be actuated by the motor need not be operated by the same pinion $b$ through which the power of the motor is transmitted to the escapement mechanism, but may be driven by the motor through another and separate connection.

It remains now to describe mechanism by which either the disks E and F of the first set or the disks $E^\times$ and $F^\times$ of the second set may be separated and at the same time the detent disk of the set (E or $E^\times$) be locked from forward rotation when the appropriate finger keys representing the amounts to be registered by the respective sets are pressed. A variety of arrangements for accomplishing this result would at once suggest themselves to any skilled mechanic, and I have deemed it sufficient to herein illustrate only one of the simplest embodiments, the same being shown particularly in Figs. 1, 2, and 7. Referring to said figures, M and N represent two pivoted bars, one above and the other below the pair of disks to be acted upon, the former being suitably connected to the key lever L in front of the pivot shaft L' thereof and the latter being suitably connected to said key lever in rear of said pivot shaft so that upon the depression of the key lever the bar M will be depressed and the bar N will be simultaneously raised and vice versa. Upon the bar M is secured by a set screw or otherwise a block M' having inclined sides as shown in Figs. 2 and 7 and provided with laterally projecting pins $m$ which latter are adapted to engage with the peripheral notches $e'$ of the adjacent disks E, F or $E^\times$ and $F^\times$ designed to be separated. Upon the lower pivoted bar N is arranged in like manner a block N' of similar wedge shape form and provided with laterally projecting pins $n$. Each time a finger key, say the five cent key controlling the operation of the disks E, F, is depressed the wedge shaped blocks M', N', the one from above and the other from below are forced between the disks E, F, the first result accomplished by this action, being to cause the lateral pins $m$, $n$, to engage the peripheral notches of said disks and thus lock the disk E from forward rotation as before explained and the second result being to cause the disks to be forced sufficiently far to draw the detents $e^3$ out of engagement with the peripheral notches in the disk G of the detent arrester and permit said disk G to be rotated backward by its spring I as hereinbefore described. Upon the removal of pressure from the finger key the blocks M and N are withdrawn from between the disks E and F, the disks again approach each other and the detents on the disk E engage the new notches of the disk G, brought opposite them by the backward motion of said disk G before the pins $m\ n$ release the disk E after which the connected disks E and G advance, under the stress of the spring motor, till the stop $g^3$ on the disk G is again arrested by the forward stop K' on the disk F. The pinion $b$ (Fig. 1) through which the disk B (Fig. 2) receives motion from the spring drum (the main motor) has twenty teeth and its motion is transmitted through gears $d'$, $d$, having likewise each twenty teeth, to a shaft $d^2$ bearing a pointer D'. This pointer is arranged to co-operate with a dial D having twenty graduations numbered in multiples of five from five to one hundred.

Since all the disks of the series receive their forward motion through the disk B to which the gear $b$ is secured it follows that the forward movement of any disk of the series due to the depression of any finger key as before described is partaken of by said disk B and gear $b$ and is indicated upon the dial D, and, if two keys are depressed at once, the sum of the forward movements resulting therefrom is likewise exhibited upon the dial. The dial thus becomes a total register of the operations of the machine and by the addition of well known counting mechanism, the revolutions of the pointer may be registered on another dial and so on *ad infinitum* till the desired capacity of the machine is reached.

The ability to operate two keys at once representing different values and to have the sum total of the values registered on a total register is one of the most valuable features of this machine.

I am aware that it has heretofore been proposed to combine a spring-motor, an escapement wheel, a detent for holding said wheel from movement, and a series of keys of different values and adjustable stops actuated thereby and co-operating with the escapement wheel, in such manner that when a key is pressed its stop is set, and the escapement wheel is freed from the detent and allowed to turn until arrested by said stop, and thereby add the value of the operated key upon a register geared to the escapement wheel or otherwise driven by the motor; but in such instance a single escapement wheel was arranged to co-operate with a series of keys and its variable movements were determined by the relative positions of the series of stops which were set by the operations of the different keys. In my machine no such series of graduated or relatively positioned stops is employed, and the operation of the escapement mechanism is radically different. Moreover, it was not possible in the instance above mentioned to cause the sum of two simultaneously operated keys to be added upon the register, as in my machine.

I am also aware that it has heretofore been proposed to combine a motor, an escapement mechanism holding in check, and a series of operating devices for said escapements, in such manner that the simultaneous operation of two or more of such devices would cause the sum of their operations to be indicated upon a register driven by the motor, but in such instances with which I am familiar the several operating devices and their co-operating escapements were adapted to cause or permit equal and uniform movements of the motor, so that when one of them was operated the motor would be allowed to move one unit of distance, when two of them were operated it would move two units of distance, when three were operated three units of distance, and so on; whereas in my machine the motor moves different distances under the operations of different keys and their co-operating escapements, and if two or more of them be operated at once the motor will be permitted to move, not simply to indicate the number which have been operated, but to register or indicate the sum of their several different values.

So far as I am aware I am the first in the art to combine a motor of any sort with an escapement mechanism of any sort holding it in check, and a series of keys of different values co-operating with the escapement mechanism in any manner to cause the latter, when two or more keys are simultaneously operated, to release the motor and permit it to move a distance proportionate to the sum of the values of the operated keys, to add such sum upon a register or for any other desired purpose, and I desire to broadly secure such combination as my invention, irrespective of the construction and arrangement of the various parts employed. So, too, I believe I am the first in the art to combine a motor with a series of escapement wheels holding it in check and a series of keys of different values co-operating with the different escapement wheels in such manner as to permit the motor, when a given key is operated, to move a distance determined by the particular escapement wheel corresponding to such operated key, and I desire to secure this and the other combinations set forth in my claims as broadly as the terms of the latter imply.

Having thus described my invention, what I claim as new is—

1. The combination of a motor, an escapement mechanism holding it in check, and a series of keys of different values co-operating with the escapement mechanism to cause the latter, when two or more keys are operated at once, to release the motor and permit it to move a distance proportionate to the sum of the different values of the operated keys, substantially as described.

2. The combination of a motor, a series of escapement wheels holding it in check, and a series of keys of different values co-operating with the respective wheels to permit the motor, when a given key is operated, to move a distance determined by the escapement wheel corresponding to such operated key, said motor moving different distances at the operations of different keys substantially as described.

3. The combination of a motor, a train of escapement wheels connected at one end with the motor and at the other to a fixed point, for holding the motor in check, and a series of keys of different values co-operating with the escapement wheels to permit the motor, when a given key is operated, to move a distance proportionate to the value of such key, said motor moving different distances at the operations of different keys substantially as described.

4. The combination of a motor, a train of escapement wheels mounted side by side upon a single shaft or axis and connected at one end with the motor and at the other to a fixed point, for holding the motor in check, and a series of keys of different values co-operating with the escapement wheels to release the motor and permit it to move different degrees proportionate to the values of the operated keys, said motor moving different distances at the operations of different keys substantially as described.

5. The combination of a motor, an escapement mechanism holding it in check, said escapement mechanism embodying two wheels, one movable by the motor and the other relatively fixed, two stops upon the fixed wheels, a lug or projection upon the other wheel co-operating with said stop to limit the movement of the movable wheel when the latter is released and turned by the motor, and an operating key and connections controlling the movable wheel, substantially as described.

6. The combination of a motor, an escapement mechanism holding it in check, said mechanism embodying a train of connected wheels arranged in pairs, the first wheel of each pair being movable with the motor, and the other wheel being relatively fixed and movable only with the movable wheel of the next adjacent pair, a pair of stops upon the fixed wheel and a co-operating projection upon the movable wheel of each pair, and a series of keys of different values co-operating with the movable wheels of the several pairs to cause them to permit the motor to move different degrees proportionate to the values of the operated keys, substantially as described.

7. In a registering machine, the combination of the disks E and G one of which is laterally movable relatively to the other and one provided with a detent and the other with co-operating receptacles or notches, the stop $g^3$ on disk G and relatively stationary stops K K', the spring I for turning the disk G in one direction and a motor for turning the disk E in the opposite direction, and a register actuated by the motor, substantially as described.

8. In a registering machine, the combination with disks B and E and the detents carried by the latter, of disks F and G, the spring I, and the limiting stops; substantially as described.

9. In a registering machine, the combination of the disk E and its detents, the disks F and G spring I, the limiting stops and the springs for pressing the disks E and F toward each other; substantially as described.

10. In a registering machine, the combination of the disks E and F having the peripheral notches or teeth, the detents on the disk E, the notched or toothed disk G, spring I and limiting stops carried by the disk F and the wedge shaped blocks carrying the projecting pins for separating the disks E and F and locking them from forward rotation while separated; substantially as described.

11. In a registering machine, the combination of the prime mover, of the shaft A, the disks B, E, F, G and the detents, springs and limiting stops carried thereby, of the second series of disks $E^\times$, $F^\times$, $G^\times$ and their detents, springs and limiting stops with the register, the key levers and the separating and locking blocks M', N' operated by the key levers; substantially as described.

THOMAS J. LOCKWOOD.

Witnesses:
H. S. RICHMAN,
ED. R. TEMPLER.